United States Patent
Murray

(10) Patent No.: US 7,175,581 B2
(45) Date of Patent: Feb. 13, 2007

(54) METHOD OF FORMING A FLEXIBLE POUCH WITH A STRAW-PIERCEABLE DIMPLE

(75) Inventor: R. Charles Murray, Sarasota, FL (US)

(73) Assignee: PPi Technologies, Inc., Sarasota, FL (US)

( * ) Notice: Subject to any disclaimer, the term of this patent is extended or adjusted under 35 U.S.C. 154(b) by 35 days.

(21) Appl. No.: 10/685,168

(22) Filed: Oct. 13, 2003

(65) Prior Publication Data

US 2004/0074396 A1 Apr. 22, 2004

Related U.S. Application Data

(62) Division of application No. 10/079,353, filed on Feb. 20, 2002, now abandoned.

(60) Provisional application No. 60/339,934, filed on Dec. 10, 2001, provisional application No. 60/270,037, filed on Feb. 20, 2001.

(51) Int. Cl.
*B31B 1/00* (2006.01)

(52) U.S. Cl. .................. 493/186; 493/199; 493/212; 53/456; 53/559

(58) Field of Classification Search .......... 493/186, 493/227, 199, 341, 194, 212; 53/559, 456, 53/552, 558, 560, 561
See application file for complete search history.

(56) References Cited

U.S. PATENT DOCUMENTS

| | | | |
|---|---|---|---|
| 3,596,829 A | 8/1971 | Gardner | 229/7 S |
| 3,868,891 A * | 3/1975 | Parish | 493/194 |
| 3,909,582 A | 9/1975 | Bowen | 219/121 LM |
| 4,072,233 A | 2/1978 | Kramer et al. | 206/634 |
| 4,429,828 A * | 2/1984 | Farber | 229/103.1 |
| 4,553,693 A * | 11/1985 | Terajima et al. | 229/75 |
| 4,762,514 A | 8/1988 | Yoshida | 493/227 |
| 4,858,766 A | 8/1989 | Tsai | 206/628 |
| 4,898,477 A | 2/1990 | Cox et al. | 383/33 |
| 5,001,325 A | 3/1991 | Huizinga | 219/121.69 |
| 5,010,714 A * | 4/1991 | Medwed et al. | 53/412 |
| 5,054,684 A | 10/1991 | Farber et al. | 229/103.1 |
| 5,201,459 A | 4/1993 | Bettle, Jr. et al. | 229/103.1 |
| 5,201,460 A | 4/1993 | Caines | 229/103.1 |
| 5,229,180 A | 7/1993 | Littmann | 428/43 |
| 5,348,217 A | 9/1994 | Bettle, Jr. et al. | 229/103.1 |
| 5,425,583 A * | 6/1995 | Wild | 383/202 |
| 5,463,200 A | 10/1995 | James et al. | 219/121.68 |
| 5,524,419 A * | 6/1996 | Shannon | 53/431 |
| 5,582,665 A * | 12/1996 | Eigen et al. | 156/69 |
| 5,603,203 A * | 2/1997 | Robache | 53/559 |
| 5,765,345 A * | 6/1998 | Svec | 53/453 |
| 5,782,404 A | 7/1998 | Robichaud et al. | 229/103.1 |
| 5,833,368 A | 11/1998 | Kaufman | 383/205 |

(Continued)

*Primary Examiner*—Sameh H. Tawfik
(74) *Attorney, Agent, or Firm*—Gifford, Krass, Groh, Sprinkle, Anderson & Citkowski, P.C.

(57) ABSTRACT

A beverage container and method for forming a beverage container having a straw pierceable portion in a wall. The beverage container has a port formed of a rigid frame having a membrane covering an aperture. The frame member is bonded to a flexible wall of a pouch. The membrane is mounted to the frame member to separate from the frame member when pushed by a straw. The frame guides the straw to the membrane. An alternative embodiment includes a dimple formed under heat and pressure in a mold pierceable by a straw.

4 Claims, 5 Drawing Sheets

U.S. PATENT DOCUMENTS

| | | | |
|---|---|---|---|
| 5,873,656 A | 2/1999 | Arkins et al. | 383/202 |
| 5,997,177 A | 12/1999 | Kaufman | 383/5 |
| 6,116,782 A | 9/2000 | Arkins et al. | 383/202 |
| 6,250,051 B1 * | 6/2001 | Mori et al. | 53/453 |
| 6,334,290 B1 * | 1/2002 | Reichert et al. | 53/559 |

* cited by examiner

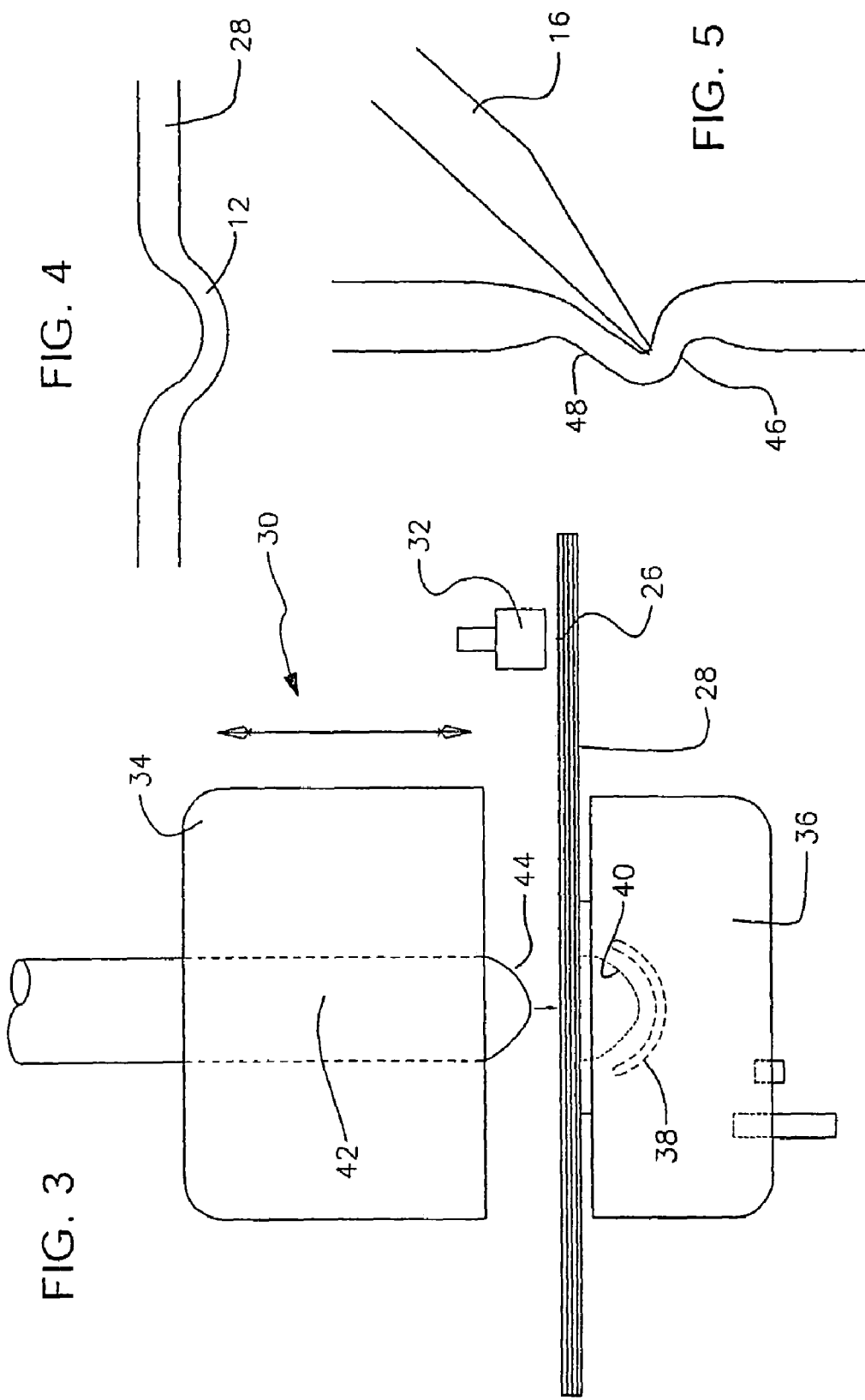

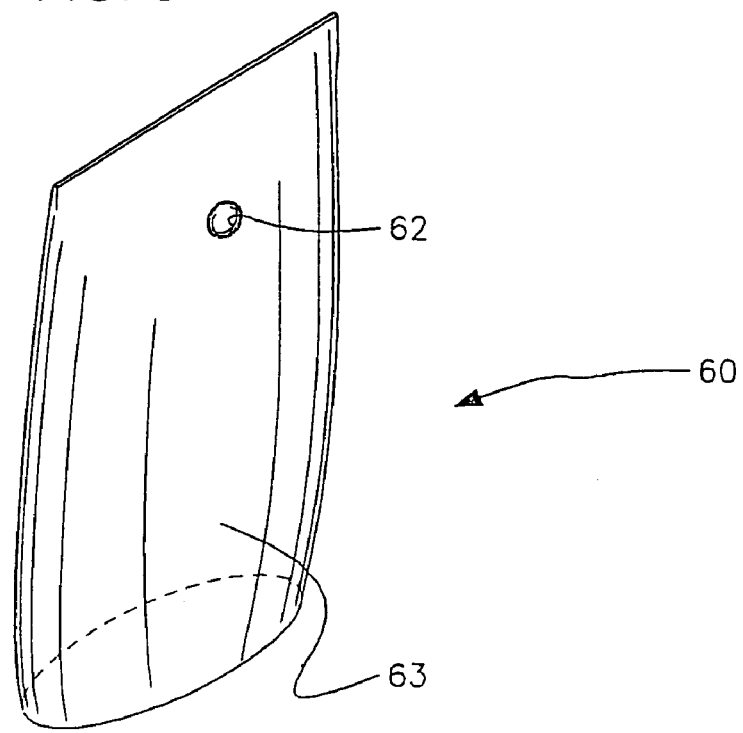
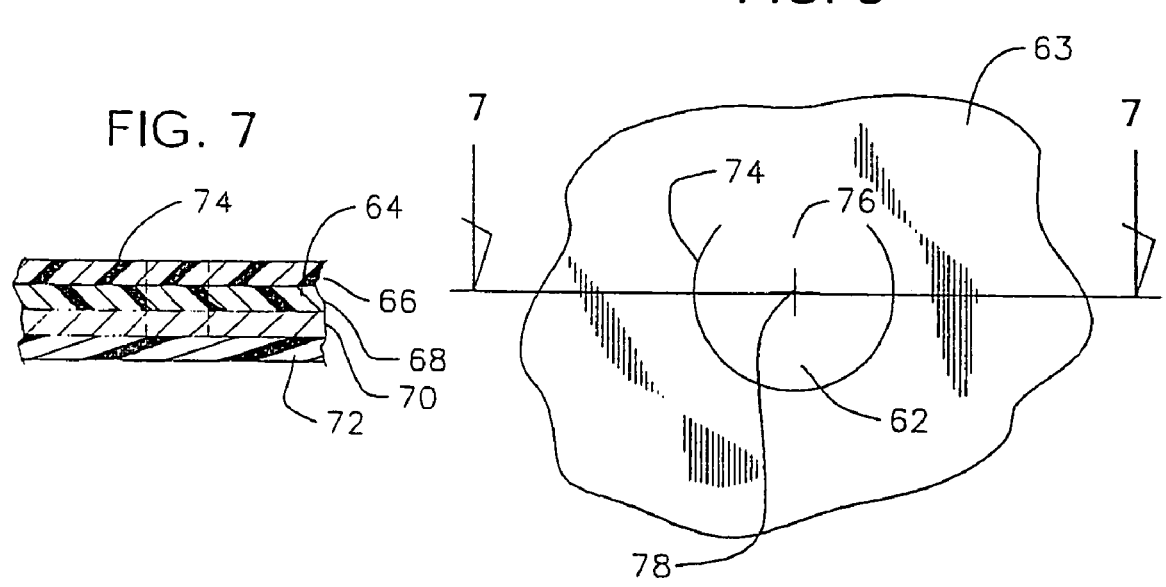

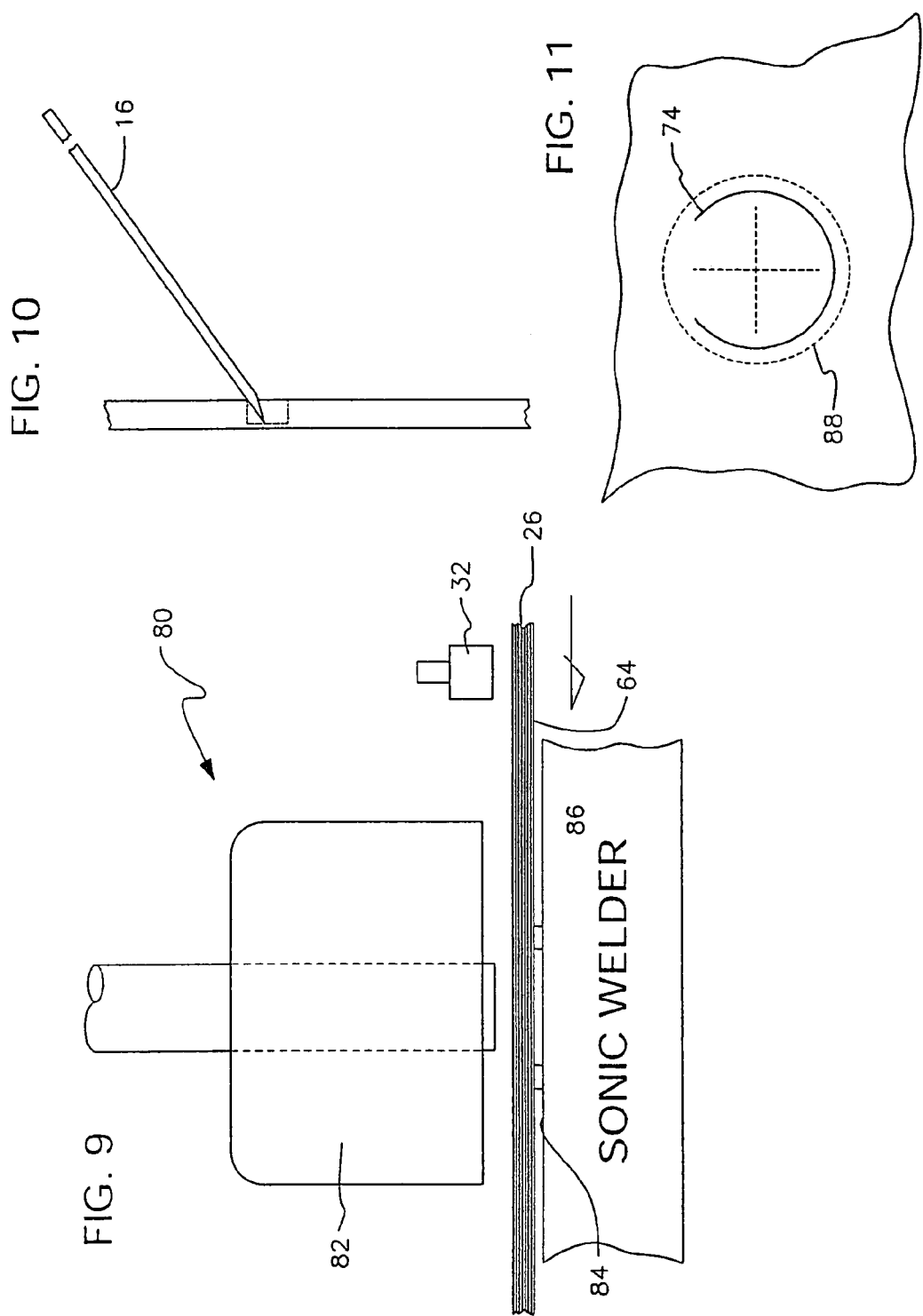

METHOD OF FORMING A FLEXIBLE POUCH WITH A STRAW-PIERCEABLE DIMPLE

This application is a divisional of U.S. patent application Ser. No. 10/079,353 filed Feb. 20, 2002 now abandoned, which claims the benefit of U.S. Provisional Application No. 60/270,037 filed Feb. 20, 2001 and U.S. Provisional Application No. 60/339,934 filed Dec. 10, 2001, which are incorporated herein by reference.

BACKGROUND OF THE INVENTION

FIELD OF THE INVENTION

Beverages such as juice have been sold in flexible pouches made from plastic film. The pouches are typically triangular in vertical cross-section and have flat bottoms which support the pouches in a stand-up position. Some pouches are products with openings for insertion of a drinking straw. However, the pouch must remain sealed before use.

As disclosed in U.S. Pat. No. 5,868,658 to Wild, it is known to form an aperture through one wall of the pouch. The wall is formed of two layers of film. A third layer of film in the form of a strip is welded about the aperture to the inner surface of the film. The aperture through the wall of two layers is covered. The contents of the pouch are accessed by inserting the straw through the aperture formed in the wall and then piercing the third layer of film. It is also known to use pull-off tabs which are used to cover the preformed aperture.

However, these and other such methods include the use of extra materials or are complex to form. The additional layers of material or tabs add financial cost to the cost of producing the pouch. Accordingly, it would be desirable to eliminate the use of additional tabs or strips of material in producing a straw pierceable pouch.

SUMMARY OF THE INVENTION

The invention relates to a pouch and a method for forming a pouch with a weakened portion of a wall. The weakened portion is formed to permit a straw to pierce the weakened portion to permit access to a beverage contained in the pouch.

In one embodiment suitable for beverages, the pouch is formed of a web of flexible material such as plastic film. A dimple is formed in a mold under heat and pressure to weaken the film. The locating indicia, such as a circle, is printed on the web around the dimple. A removable patch is placed over the dimple. The method of manufacture includes forming a locating indicia on a web of flexible material and a registration mark for registering a web, indexing the web at a molding station, pressing and heating a portion of the web in a mold to form the dimple and then forming a pouch from the web.

A first preferred alternative embodiment suitable for use with a pouch formed of a web having a layer of metal foil includes cutting partially through the laminate with a laser to form a frangible portion for piercing by the straw.

A second preferred alternative embodiment includes bonding a port to the pouch. The port includes a frame member having an aperture covered by a removable membrane. The membrane is a strip of plastic or metal foil which is adhered to an inner side of the frame member. The port is bonded to the wall to cover an aperture formed therein. The membrane is affixed to the frame by an adhesive which separates upon pressure from the straw during piercing. The frame provides a target for guiding the straw.

BRIEF DESCRIPTION OF THE DRAWINGS

Other advantages of the present invention will be readily appreciated by reference to the following detailed description when considered in connection with the accompanying drawings, wherein:

FIG. 3 is a side view of a molding station for forming the dimple in a web in accordance with the preferred embodiment of the invention;

FIG. 4 is a cross-sectional view of a wall showing a straw in position to pierce the dimple in accordance with the preferred embodiment of the invention;

FIG. 5 is a cross-sectional view of the dimple after it is formed in the web in accordance with the preferred embodiment of the invention;

FIG. 6 is a pouch having a frangible flap portion formed in a side wall in accordance with a first alternative preferred embodiment of the invention;

FIG. 7 is a cross-sectional side view of the invention showing a frangible cut in accordance with a first alternative preferred embodiment of the invention;

FIG. 8 is a top view of a section of the wall showing the frangible flap portion in accordance with the first preferred embodiment of the invention;

FIG. 9 is a schematic view of a cutting station in accordance with the first preferred embodiment of the invention;

FIG. 10 is a side view of a portion of the wall of the pouch in accordance with the first preferred embodiment of the invention;

FIG. 11 is a top view of the web after cutting in accordance with the first alternative preferred embodiment of the invention;

DETAILED DESCRIPTION OF THE PREFERRED EMBODIMENTS

Figure 1:
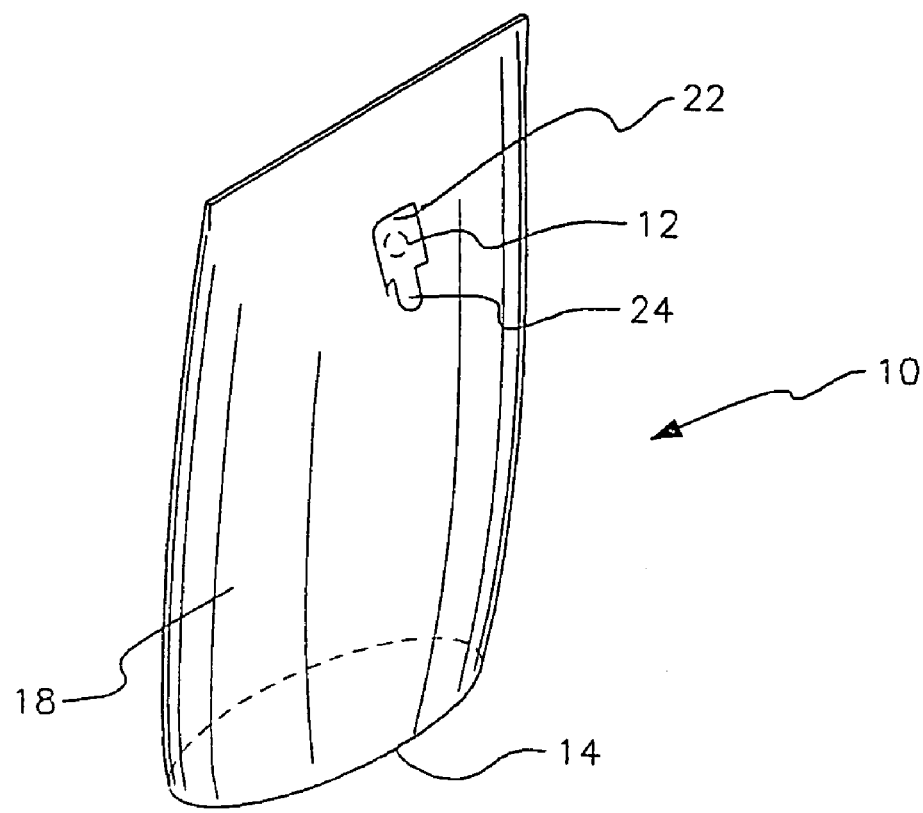
FIG. 1 is a perspective view of a stand-up flexible pouch having a dimple in accordance with the preferred embodiment of the invention.

A container or stand-up pouch 10 for holding beverage having a straw pierceable dimple 12 in accordance with the invention is shown in FIGS. 1–5. The straw pierceable dimple 12 is provided for accessing the beverage contained in the pouch and, as shown in FIG. 1, the pouch 10 is of the type having a bottom panel 14 and gussets formed to support the pouch 10 in an upright position. The invention, however, may be utilized with many types of containers having flexible walls.

As shown in FIG. 4, the dimple 12 is pierceable by a drinking straw 16.

Shown in FIG. 1 is the pouch 10 formed of flexible plastic film, such as polyethylene and polypropylene. The pouch has a dimple 12 formed in an upper portion of a front wall 18. As discussed below, the dimple 12 has a parabolic shape to facilitate insertion of a straw.

Figure 2:
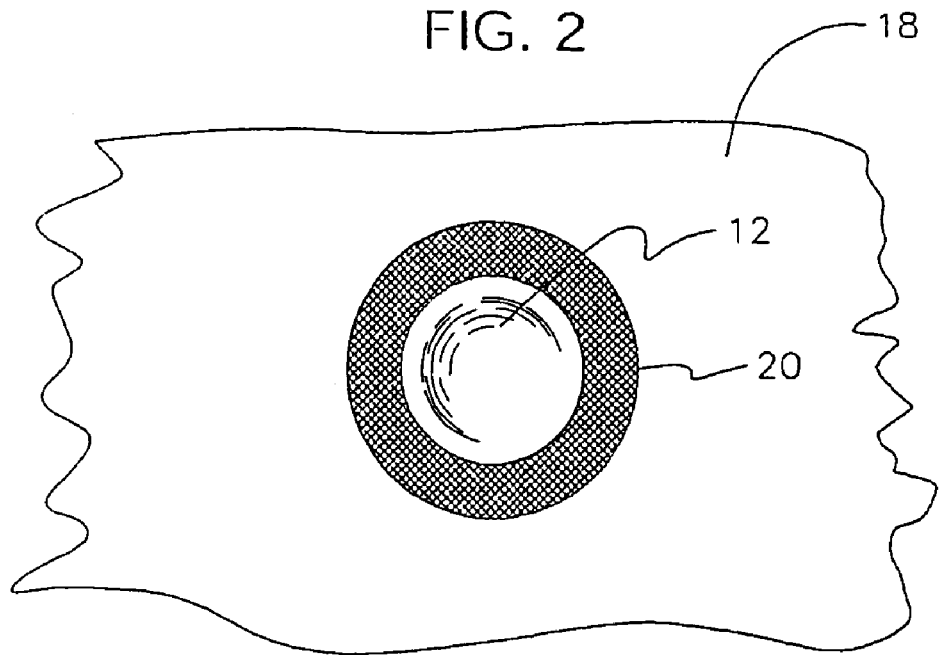
FIG. 2 is a side view of a portion of a web showing an identifying indicia in accordance with the preferred embodiment of the invention.

As shown in FIG. 2, a locating indicia such as a ring 20 is formed about the dimple in a suitable manner, such as printing, to permit easy identification of the dimple. A protective cover 22 may be placed over the dimple with an adhesive which permits removal by a tab 24 to prevent inadvertent puncture during transportation and storage.

The pouch 10 may be formed on conventional pouch manufacturing equipment, including horizontal form-fill-seal machines, flat bed pre-made pouch machines, or vertical form-fill-seal machines. These machines form the pouches from a roll of the plastic film. The film is preprinted with labeling and other packaging information. The locating indicia or ring 20 is preprinted along with registration marks 26 (FIG. 3). The film is taken from a roll and formed into a web 28 of two to four layers of film.

As shown in FIG. 3, the web 28 is then moved to a molding station 30. The registration mark 26 is read by a scanner 32 to index the web 28 at the molding station 30. The molding station 30 includes a male mold element 34 and a female mold element 36. The female mold element 36 includes a heating element 38 and has a parabolic cavity 40 to receive the web 28. The male mold element 34 includes a heated rod 42 having a parabolic shaped end 44 complementary to the shape of the female mold element 36. The male mold element 34 is connected to an apparatus (not shown) which raises and lowers the male mold element.

The web is indexed to position the locating indicia 20 around the cavity 40 of the female mold element 36 and the male mold element 34 is moved downwardly to compress the web briefly between the male and female mold elements 34, 36. The web is heated and compressed. The time and pressure must be adjusted for the film gauge to avoid penetration of the film. For a four-gauge film, the film is compressed at 80 strokes per minute at a pressure of 100 psi. The male mold is heated to a temperature below the melting point of the plastic, for instance, 240°.

As shown in FIGS. 4 and 5, a parabolic dimple 12 is formed in the web. Because heat shrinks plastic, the dimple 12 has a thickness thinner than the remainder of the web. For instance, a web having a thickness of 4 gauge is reduced in thickness to approximately 2 gauge after being molded to form the dimple 12.

As shown in FIGS. 4 and 5, the parabolic dimple assumes a somewhat triangular cross-section when pressed by the pointed end of the straw 16. The dimple 12 then takes a triangular shape with a shorter wall 46 transverse the point and a longer wall 48 which extends generally parallel to the axis of the straw as it is being pressed downwardly towards the bottom of the pouch. Thus, the longer wall 48 of the dimple acts to guide the straw through the dimple 12 into the pouch 10.

As shown in FIGS. 6–11, a first alternative preferred embodiment of the invention includes a pouch 60 with a frangible flap 62 cut with a laser in the wall 63.

The first alternative preferred embodiment is particularly suited for a pouch formed from a web having one or more layers of metal foil. The foil layers do not deform when heated.

As shown in FIG. 7, a web 64 for forming the pouches has four layers of material. The web has an outer layer 66, a second layer 68 and inner layer 72 of a plastic web, and a third layer 70 of foil.

The flap 62 is cut in the top, second, and third layers 66, 68, and 70 by a laser cutter. The cutter forms a cut 74 having an arc of 270°–300°, as shown in FIG. 8. The flap 62 remains connected to the wall 63 by a strip 76 to prevent the flap from falling into the pouch. A piercing indicator 78 may be formed on the flap to indicate a target for the straw 16.

The flap 62 is formed in the web 64 at a cutting station 80 as shown in FIG. 9. After the web 64 is formed and moved to the cutting station 80, a scanner 32 reads the registration mark 26 to index the web 64 at the desired location.

As shown in FIG. 9, the cutting station 80 includes a laser-cutting unit 82 which is stationed above platform 84 supporting the film. A controller (not shown) then activates the cutting unit 82 to form the circular cut 74 partially through the film. The cutting unit 82 is controllable to cut to a precise depth so that although the wall is weakened, it remains intact. A piercing indicator 78 may also be used to bond the layers of the web together in a ring around the cut 74 formed by the cutting unit.

As shown in FIG. 10, the inner layer 72 of the wall 63 is pierced when pressed by the pointed end of the web. The piercing indicator 78 cut in the wall facilitates location of the point of the straw 16. As the flap 62 is pushed by the straw 16, the remaining inner layer 72 of material is pierced to permit entry of the straw 16 into the pouch.

Figure 12:
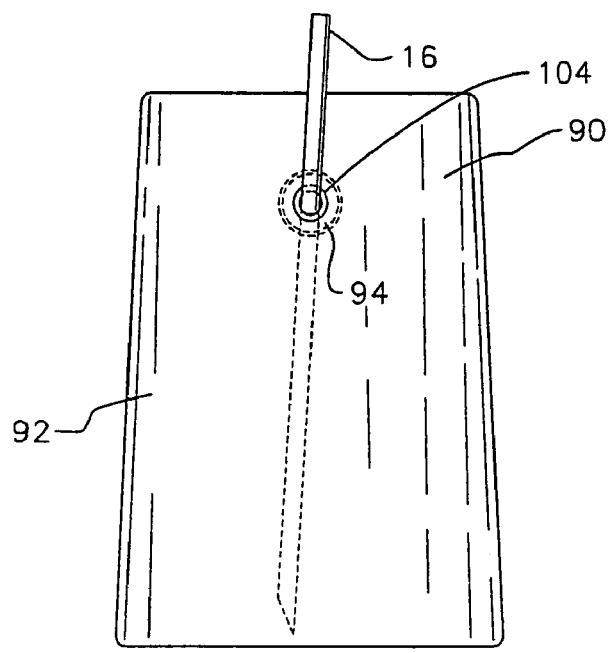
FIG. 12 is a perspective view of a pouch having a port in accordance with the second preferred embodiment of the invention.
Figure 13:
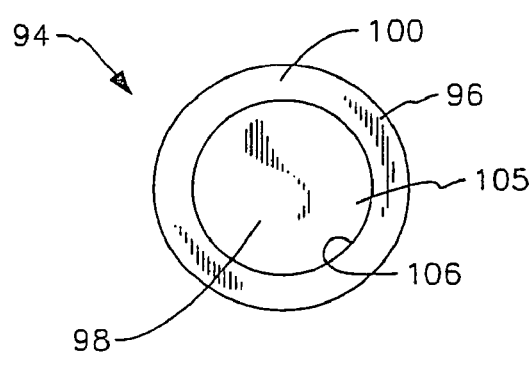
FIG. 13 is a top view of a frame and membrane in accordance with the second preferred embodiment of the invention.
Figure 14:
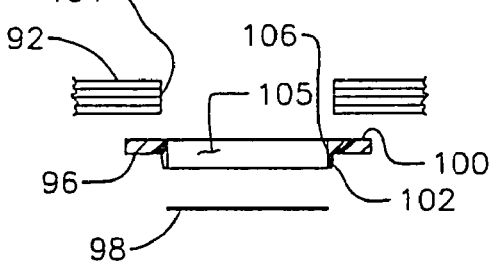
FIG. 14 is an exploded side view of the frame and membrane in accordance with the second preferred embodiment of the invention.

A second preferred embodiment of the invention is shown in FIGS. 12–14. As shown in FIG. 12, a pouch 90 having a port 94 for insertion of the straw 16 is thereshown.

As shown in FIGS. 13 and 14, the port 94 includes a molded frame 96 and a flexible membrane 98 extending over an aperture 105 formed in the frame 96. The frame 96 is formed of a moldable material such as nylon or polyethylene. The frame 98 has a flat mounting surface 100 on one side. A circumferential wall 106 defines an aperture 105 for receiving and guiding the straw 16. Although the frame 102 is shown as having a circular profile, the profile may be any shape, such as a star or rectangle. The wall 106 defining the aperture 105 of the frame 96 has sufficient diameter or width to accept the straw 16 therebetween. The membrane 98 is formed from either plastic film or metal foil. The member 98 is bonded to the flange 102 of the frame member by a suitable method. In most applications, the membrane 98 is a laminate having a top layer of heat shrinkable plastic material such as polyethylene and polyester. The membrane 8 is thus affixed by heat shrinking as is known in the art. In the case of some materials it is desirable to use an adhesive which separates when the straw impacts the membrane. The port is attached to an inner surface of the web 92 in a suitable manner, such as ultra-sonic welding.

An aperture 104 is formed in the web at a cutting station having dimensions complimentary with the aperture 106 in the frame. The web is moved to a mounting station where an arm places the mounting surface of the frame on an inner surface of the web. The port is sonically welded to the web. The membrane 98 is accessible through the aperture 104 in the web. The web is then trimmed into panels and formed into a pouch in the conventional manner.

In this way, a straw-pierceable membrane is affixed to the pouch permitting effective straw-pierceable access to the contents of the pouch. While specific embodiments of the invention have been shown, described to illustrate the present invention, it is to be understood that the invention may be embodied otherwise without departing from the principals. For example, one skilled in the art will recognize from such a discussion and the accompanying drawings and claims that various modifications and variations can be made without departing from the spirit and scope of the invention as defined in the following claims.

I claim:

1. A method of forming a flexible pouch for a product having a straw pierceable dimple, said method comprising the steps of:
   providing a web of one material having a registration mark, and a locating indicia for identifying a straw pierceable portion of the flexible pouch, wherein the locating indicia is circular in shape;
   indexing the web at a molding station using the registration mark and the locating indicia, wherein the molding station includes a male mold element having a heated rod and an opposed female mold element having a parabolic cavity, and the male mold element and female mold element are centered within the locating indicia;
   molding the dimple having a parabolic shape within the locating indicia in the web of material at the molding station, by compressing the web of material between the male mold element and the female mold element and applying heat, so that the cross-sectional thickness of the dimple within the locating indicia is less than the cross-sectional thickness of the web of material outside the locating indicia; and
   forming the flexible pouch from the web of material, wherein the flexible pouch has an upper edge, a lower edge and side edges locating therebetween the upper and lower edges, and the straw pierceable dimple is positioned near the upper edge of the flexible pouch, to access the product in the pouch by piercing the straw pierceable dimple with a straw.

2. The method as set forth in claim 1 wherein said method of forming the flexible pouch further includes the step of forming the web into a panel.

3. The method as set forth in claim 1 wherein the dimple is formed on a wall of the pouch and protrudes into the pouch.

4. A method of forming a flexible pouch for a product having a straw pierceable dimple, said method comprising the steps of:
   providing a web of one material having a registration mark and a locating indicia for identifying a straw pierceable portion of the flexible pouch, wherein said locating indicia is circular in shape;
   indexing the web at a molding station using the registration mark and the locating indicia, wherein the molding station includes a male mold element having a heated rod and an opposed female mold element having a parabolic cavity, and the male mold element and female mold element are centered within the locating indicia;
   molding the dimple having a parabolic shape protruding into the pouch within the locating indicia in the web of material at the molding station, by compressing the web of material between the male mold element and the female mold element and applying heat, so that the cross-sectional thickness of the dimple within the locating indicia is less than the cross-sectional thickness of the web of material outside the locating indicia; and
   forming the flexible pouch from the web of material, wherein the flexible pouch has an upper edge, a lower edge, and side edges extending therebetween the upper and lower edges, and the straw pierceable dimple is positioned in a wall of the flexible pouch near the upper edge of the flexible pouch, to access the product in the pouch by piercing the straw pierceable dimple with a straw.

* * * * *